US012754018B2

(12) United States Patent
Roudebush et al.

(10) Patent No.: US 12,754,018 B2
(45) Date of Patent: Oct. 6, 2026

(54) LASER LEVELS AND ACCESSORIES

(71) Applicant: Milwaukee Electric Tool Corporation, Brookfield, WI (US)

(72) Inventors: George I. Roudebush, Wauwatosa, WI (US); Samuel A. Gould, West Allis, WI (US); Danielle K. Quan, Somerville, MA (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 856 days.

(21) Appl. No.: 18/066,084

(22) Filed: Dec. 14, 2022

(65) Prior Publication Data

US 2023/0119676 A1 Apr. 20, 2023

Related U.S. Application Data

(63) Continuation of application No. PCT/US2022/043198, filed on Sep. 12, 2022.

(60) Provisional application No. 63/272,020, filed on Oct. 26, 2021, provisional application No. 63/243,439, filed on Sep. 13, 2021.

(51) Int. Cl.
*G01C 15/00* (2006.01)

(52) U.S. Cl.
CPC .................................. *G01C 15/004* (2013.01)

(58) Field of Classification Search
CPC ..... G01C 15/02; G01C 15/004; G01C 15/105
USPC ............................................................ 33/228
See application file for complete search history.

(56) References Cited

U.S. PATENT DOCUMENTS

| | | | | |
|---|---|---|---|---|
| 4,035,084 | A | 7/1977 | Ramsay | |
| 4,519,705 | A | 5/1985 | Morrow | |
| 5,144,487 | A | 9/1992 | Hersey | |
| 5,218,770 | A | 6/1993 | Toga | |
| 5,539,990 | A | 7/1996 | Le | |
| 5,754,582 | A | 5/1998 | Dong | |
| 6,065,217 | A | 5/2000 | Dong | |
| 6,643,004 | B2 | 11/2003 | Detweiler et al. | |
| 6,754,969 | B2 | 6/2004 | Waibel | |
| 6,870,608 | B2 | 3/2005 | Detweiler et al. | |
| 6,871,408 | B2 * | 3/2005 | Malard | G01C 15/004 33/291 |
| 6,941,665 | B1 | 9/2005 | Budrow et al. | |
| 7,064,819 | B2 | 6/2006 | Detweiler et al. | |
| 7,116,697 | B1 | 10/2006 | Dong | |

(Continued)

FOREIGN PATENT DOCUMENTS

| | | |
|---|---|---|
| CN | 2786559 | 6/2006 |
| CN | 202013193 | 10/2011 |

(Continued)

OTHER PUBLICATIONS

International Search Report and Written Opinion for International Application No. PCT/US2022/043198, dated Dec. 27, 2022, 9 pages.

*Primary Examiner* — John E Breene
(74) *Attorney, Agent, or Firm* — Reinhart Boerner Van Deuren s.c.

(57) ABSTRACT

Various embodiments of a laser level and laser level accessories are provided. In one embodiment a laser level is provided that emits a laser line and a laser point that intersects the laser. The laser line and laser point are rotated such that they continue to intersect each other as the laser line and laser point are rotated.

20 Claims, 9 Drawing Sheets

(56) References Cited

U.S. PATENT DOCUMENTS

| | | | |
|---|---|---|---|
| 7,152,334 B2 | 12/2006 | Gamal et al. | |
| 7,181,853 B2 | 2/2007 | Heger et al. | |
| 7,237,341 B2 | 7/2007 | Murray | |
| 7,266,897 B2 | 9/2007 | Treichler et al. | |
| 7,316,073 B2 | 1/2008 | Murray | |
| 7,441,340 B2 | 10/2008 | Hertzman | |
| 7,675,612 B2 | 3/2010 | Kallabis | |
| 7,676,939 B2 | 3/2010 | Scheyer | |
| 8,087,176 B1 | 1/2012 | Hayes et al. | |
| 8,281,495 B2 | 10/2012 | Hayes et al. | |
| 8,307,562 B2 | 11/2012 | Bascom et al. | |
| 8,595,946 B2 | 12/2013 | Hayes et al. | |
| 8,640,350 B2 | 2/2014 | Bascom et al. | |
| 8,745,884 B2 | 6/2014 | Hayes | |
| 8,943,701 B2 | 2/2015 | Hayes et al. | |
| 9,074,875 B2 | 7/2015 | Hunze | |
| 9,110,308 B2 | 8/2015 | Zimmermann | |
| 9,303,990 B2 | 4/2016 | Bascom et al. | |
| 9,494,424 B2 | 11/2016 | Unger | |
| 9,562,766 B2 | 2/2017 | Bascom et al. | |
| 10,119,817 B2 | 11/2018 | Spaulding et al. | |
| 10,145,676 B2 | 12/2018 | Hayes et al. | |
| 10,393,521 B2 | 8/2019 | Jiang et al. | |
| 12,152,882 B2 * | 11/2024 | Gould | G01C 15/006 |
| 2001/0038447 A1 | 11/2001 | Detweiler et al. | |
| 2002/0057426 A1 * | 5/2002 | Ohtomo | G01C 15/004 356/141.4 |
| 2009/0113731 A1 | 5/2009 | Kallabis et al. | |
| 2010/0073759 A1 | 3/2010 | Kodaira | |
| 2013/0276315 A1 * | 10/2013 | Kahle | G01C 15/004 33/291 |
| 2019/0056215 A1 | 2/2019 | Hayes et al. | |
| 2019/0162536 A1 | 5/2019 | Zhang et al. | |
| 2019/0331489 A1 | 10/2019 | Jiang et al. | |
| 2020/0116485 A1 | 4/2020 | Melton | |
| 2022/0146844 A1 * | 5/2022 | Zhang | G02B 27/30 |

FOREIGN PATENT DOCUMENTS

| | | |
|---|---|---|
| CN | 203572488 | 4/2014 |
| CN | 204346435 | 5/2015 |
| CN | 111256667 | 6/2020 |
| CN | 211696387 | 10/2020 |
| DE | 19757461 | 6/1999 |
| EP | 0819911 | 6/2002 |
| EP | 1916500 | 12/2010 |
| KR | 10-2012139 | 8/2019 |
| WO | WO10108720 | 9/2010 |
| WO | WO11098608 | 8/2011 |
| WO | WO11113188 | 9/2011 |
| WO | WO15096060 | 7/2015 |

* cited by examiner

LASER LEVELS AND ACCESSORIES

CROSS-REFERENCE TO RELATED PATENT APPLICATIONS

The present application is a continuation of International Application No. PCT/US2022/043198, filed Sep. 12, 2022, which claims the benefit of and priority to U.S. Provisional Application No. 63/272,020, filed on Oct. 26, 2021, and U.S. Provisional Application No. 63/243,439, filed on Sep. 13, 2021, each of which is incorporated herein by reference in its entirety.

BACKGROUND OF THE INVENTION

The present disclosure is directed generally to the field of tools. The present disclosure relates specifically to laser levels.

SUMMARY OF THE INVENTION

One exemplary method of using an embodiment this invention relates to emitting a plane of light from a first laser light generator to form a line of light on a surface, the first laser light generator coupled to a base of the laser beam generating device, and emitting a beam of light from a second laser light generator to form a point of light on the surface, the second laser light generator coupled to the base, the point of light intersecting the line of light. The method further includes receiving a first instruction to rotate the plane of light and the beam of light. In response to receiving the first instruction, the plane of light is rotated with respect to the base about an axis, and the beam of light is rotated with respect to the base about the axis such that the point of light continuously intersects the line of light while the plane of light and the beam of light are being rotated.

In various exemplary embodiments, the plane of light is rotated 360 degrees. In various exemplary embodiments, the method includes adjusting where the point of light intersects the line of light. In various exemplary embodiments, the method includes adjusting an orientation of the line of light to a vertical orientation or a horizontal orientation. In various exemplary embodiments, the plane of light is rotated by a first actuator and the beam of light is rotated by a second actuator distinct from the first actuator. In various exemplary embodiments, the plane of light includes a first color and the beam of light includes a second color distinct from the first color. In various exemplary embodiments, the plane of light includes a first color and the beam of light includes a second color distinct from the first color. In various exemplary embodiments, the first instruction is received wirelessly from a remote control.

Another embodiment of the invention relates to a laser beam generating device including a base, a housing coupled to the base, a first laser light generator disposed within the housing operable to emit a plane of light to form a line of light on a surface, a second laser light generator disposed within the housing operable to emit a beam of light to form a point of light on the surface, the beam of light intersecting the plane of light, and an actuator system. The actuator system is configured to rotate the plane of light with respect to the base about an axis that intersects the housing, and the actuator system is configured to move where the point of light intersects the line of light.

In various exemplary embodiments, the actuator system includes a first actuator configured to rotate the plane of light and a second actuator configured to move where the point of light intersects the line of light. In various exemplary embodiments, the plane of light includes a first color and the beam of light includes a second color distinct from the first color. In various exemplary embodiments, the plane of light includes a first color and the beam of light includes a second color distinct from the first color. In various exemplary embodiments, the actuator system is configured to orient the line of light to one of a horizontal orientation or a vertical orientation. In various exemplary embodiments, the actuator system is configured to rotate the plane of light 360 degrees. In various exemplary embodiments, the actuator system rotates the plane of light in response to the laser beam generating device wirelessly receiving a signal from a remote control.

Another embodiment of the invention relates to a laser beam generating device including a base, a housing coupled to the base, a first laser light generator coupled to the housing and operable to generate a line of light on a surface, a second laser light generator coupled to the housing and operable to generate a point of light on the surface such that the point of light intersects the line of light, and an actuator system. The actuator system is configured to rotate the line of light and the point of light with respect to the base about an axis that intersects the housing, and the point of light continuously intersects the line of light while the line of light and the point of light are being rotated.

In various exemplary embodiments, the actuator system rotates the line of light in response to the laser beam generating device wirelessly receiving a signal from a remote control. In various exemplary embodiments, the actuator system is configured to rotate the plane of light 360 degrees. In various exemplary embodiments, the line of light includes a first color and the point of light includes a second color distinct from the first color. In various exemplary embodiments, the actuator system includes a first actuator configured to rotate the line of light and a second actuator configured to move where the point of light intersects the line of light.

Another embodiment of the invention relates to a method of using a laser beam generating device. The method includes emitting a plane of light from a first laser light generator of the laser beam generating device that forms a line of light on a surface, and emitting a beam of light from a second laser light generator of the laser beam generating device that forms a point of light on the surface, the point of light intersecting the line of light. The method further includes receiving a first instruction to rotate the plane of light and the beam of light, and in response to receiving the first instruction performing the following two steps. First, rotating the plane of light with respect to the laser beam generating device about an axis. Second, rotating the beam of light with respect to the laser beam generating device about the axis such that the point of light continuously intersects the line of light while the plane of light and the beam of light are being rotated.

In various embodiments the method further includes receiving a second instruction to adjust where the point of light intersects the line of light from a first location to a second location different than the first location. In response to receiving the second instruction, the method further includes adjusting an aim of the second laser light generator such that the point of light intersects the line of light at the second location.

Another embodiment of the invention relates to laser beam generating device including a housing, a first laser light generator within the housing, a second laser light generator disposed within the housing, a first actuator and a second actuator. The first laser light generator is operable to emit a plane of light that forms a line of light on a surface. The second laser light generator is operable to emit a beam of light that forms a point of light on the surface, the point of light intersecting the line of light. The first actuator is configured to rotate the plane of light with respect to an axis that intersects the housing, and the second actuator is configured to adjust where the point of light intersects the line of light.

In various embodiments, the laser beam generating device includes a self-leveling mechanism configured to orient the line of light to one of a horizontal orientation or a vertical orientation. In various embodiments, the plane of light includes a first color and the beam of light includes a second color different than the first color.

Various embodiments the invention relates to laser levels and accessories including a variety of features and designs for improved performance.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
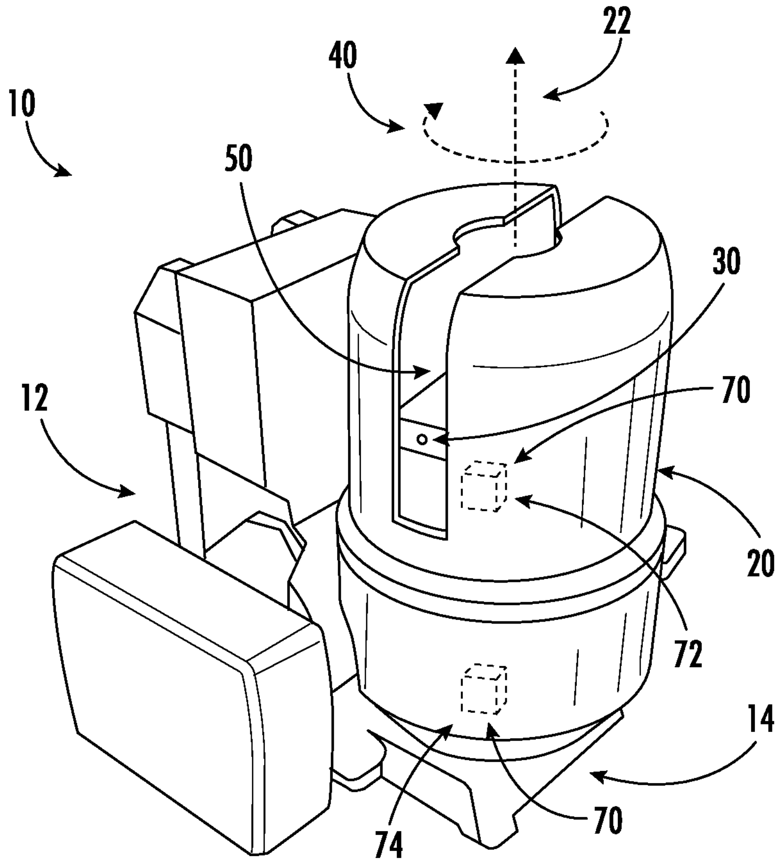
FIG. 1 is a perspective view of a laser level, according to an exemplary embodiment.
Figure 2:
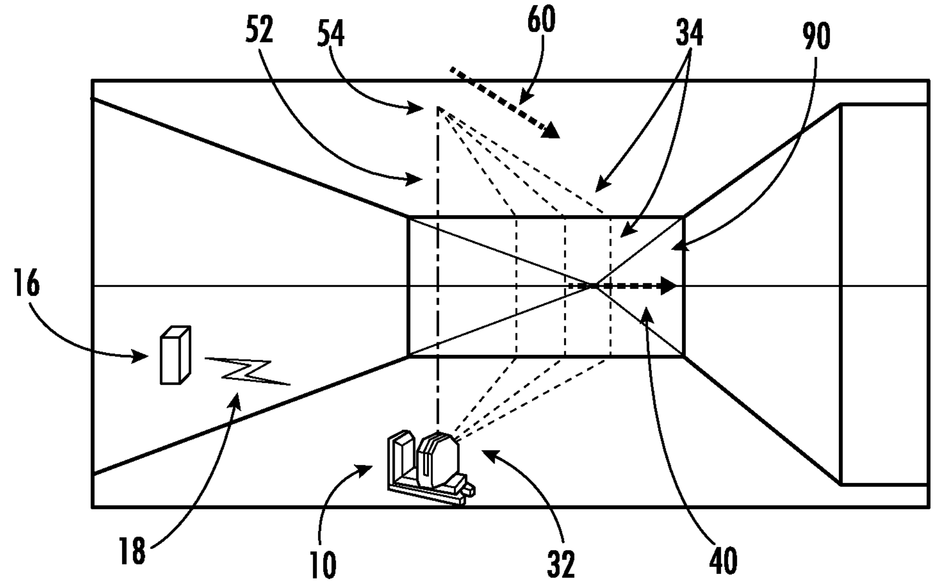
FIG. 2 is a perspective view of the laser level of FIG. 1 positioned on the floor, according to an exemplary embodiment.
Figure 3:
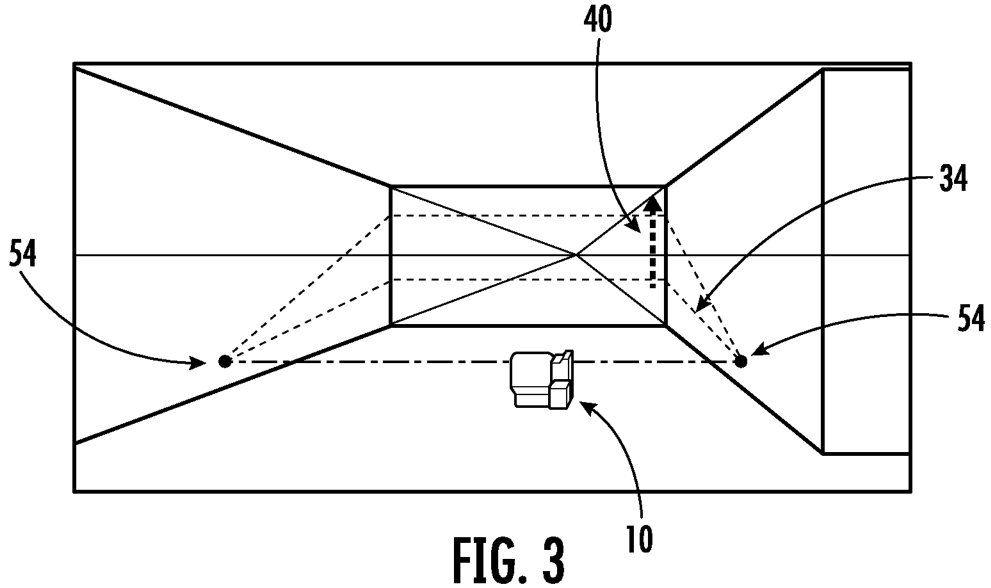
FIG. 3 shows the laser level of FIG. 1 oriented horizontally on the floor, according to an exemplary embodiment.
Figure 4:
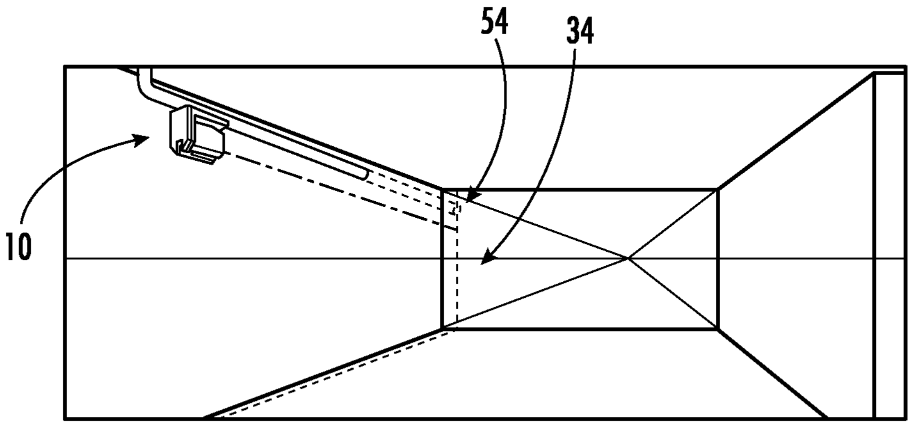
FIG. 4 is a perspective view of the laser level of FIG. 1 positioned on a wall, according to an exemplary embodiment.
Figure 5:
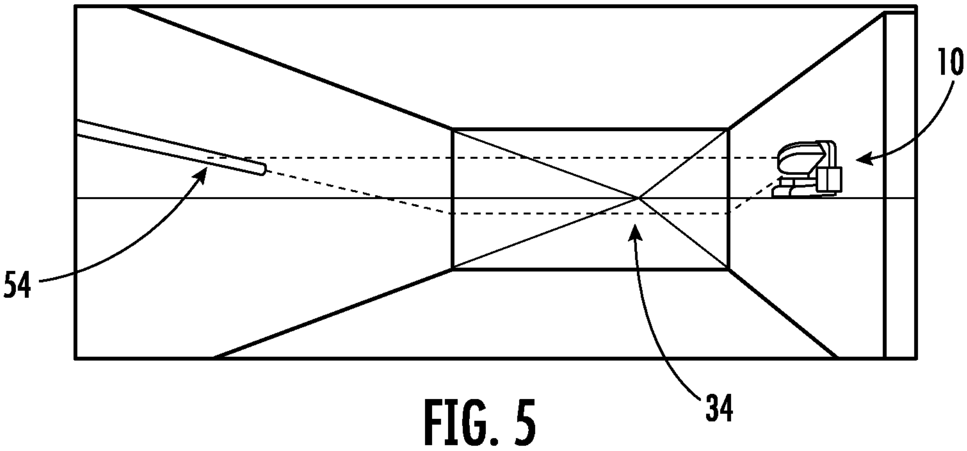
FIG. 5 is a perspective view of the laser level of FIG. 1 positioned on a wall, according to an exemplary embodiment.

Referring generally to the figures, various embodiments of laser levels and related accessories, are provided.

As explained in more detail in the attached figures, in general, the laser levels and accessories include features, arrangements, structures, etc. for improving operation and use of laser levels, for example, to perform various building tasks.

According to one embodiment, provided is a laser level that emits a line of light of a first color and a point of light of a second color distinct from the first color, the point of light intersecting the line of light. The laser level is configured to adjust the orientation of the line of light to horizontal or vertical, depending on the orientation of the housing. The location where the point of light intersects the line of light can be adjusted, such as remotely via a remote control.

The line of light can be rotated with respect to the housing. For example, if the line of light is vertical, then the line can be adjusted to either the left or right. When the line of light is rotating, the point of light is correspondingly rotated as well, if necessary, such that the point of light continues to intersect the line of light throughout rotation of the line of light.

Referring to FIGS. 1-5, a laser emitter and/or laser beam generating device, shown as laser level 10, is shown. Laser level 10 includes housing 20, which rotates around axis 22 with respect to base 14. In various embodiments, housing 20 is coupled to base 14, such as being rotatably coupled. Laser level 10 includes a first laser light generator, shown as first laser emitter 30, and a second laser light generator, shown as second laser emitter 50. In various embodiments, first laser emitter 30 and/or second laser emitter 50 are coupled to and/or disposed within housing 20. First laser emitter 30 is configured to and/or operable to emit a plane of light 32 in the form of a line and/or a continuous series of points, to form line of light 34 on surface 90. Second laser emitter 50 is configured to and/or operable to emit a beam of light 52 such that beam of light 52 forms a point of light 54 on surface 90, the point of light 54 intersecting line of light 34. Laser level 10 includes a wireless communication module, shown as radio-frequency transceiver 12, for wirelessly communicating with other devices, such as a remote control for laser level 10.

Housing 20 is configured to be rotated, such as in direction 40 or the opposite direction. When rotated in direction 40, line of light 34 and point of light 54 also rotate such that point of light 54 continues to intersect line of light 34. In particular, as the aim of plane of light 32 emitted by first laser emitter 30 is adjusted such that line of light 34 rotates (e.g., such as by housing 20 rotating), the aim of beam of light 52 emitted from second laser emitter 50 is also adjusted (e.g., such as by housing 20 rotating) such that point of light 54 continuously intersects line of light 34 as point of light 54 and line of light 34 are being rotated.

Further, second laser emitter 50 can be adjusted in direction 60 or the perpendicular direction such that point of light 54 from beam of light 52 intersects line of light 34 at a different location. Stated another way, point of light 54 can be adjusted while line of light 34 remains stationary, thereby adjusting where point of light 54 intersects line of light 34. In various embodiments, a remote device (e.g., remote control 16) is configured to wirelessly control the positions and angles of the line of light 34 and the point of light 54. In various embodiments the plane of light 32 includes a first color (e.g., red) and the beam of light 52 includes a second color (e.g., green) distinct from the first color (e.g., quickly recognizable to be a different color).

Laser level 10 is configured to rotate line of light 34 and point of light 54 such that line of light 34 and point of light 54 continuously intersect independent of where they intersect. For example, if point of light 54 is adjusted to intersect line of light 34 at a location other than an orthogonal position with respect to laser level 10 (e.g., in the middle of the far wall in FIG. 2), and subsequently line of light 34 and point of light 54 are rotated, line of light 34 and point of light 54 will continuously intersect as line of light 34 and point of light 54 are rotated.

In various embodiments, laser level 10 includes leveling mechanisms (e.g., actuator system 70) to adjust the orientation of line of light 34 into either the vertical orientation (FIG. 2) or horizontal orientation (FIG. 3), depending on the orientation of housing 20. For example, the laser level 10 can be leveled by moving one of two actuators, each consisting of a motor with an encoder attached to the motor's rotating shaft, and a gearbox transmission. One of the actuators can rotate the laser(s) (e.g., plane of light 32), such as when plane of light 32 is forming a vertical line of light 34 on surface 90, 360 degrees in either direction, and the other actuator can tilt the laser line within a limited range. The actuators control the rotations of the plane of light 32 with respect to two level sensors, mounted perpendicular to each other, which read level when the housing 20 is mounted in a horizontal and vertical orientation respectively. The beam of light 52 is connected to an actuator and level sensor that enables the point of light 54 to rotate in-line with line of light 34. In various embodiments, the level sensor of the second laser emitter 50, which emits beam of light 52, reads level when beam of light 52 is plumb.

The laser level 10 includes two degrees of movement. A first degree of movement is a self-leveling mechanism, such as by using one or more bubble vials with light sensors to determine whether the housing 20 is level. A second degree of movement is the ability to rotate the first laser emitter 30 and/or second laser emitter 50 with respect to the self-leveling mechanism. Once the self-leveling mechanism is set, the line of light 34 can then be projected and be spun around.

In various embodiments, actuator system 70 is configured to adjust an orientation of the line of light 34 to a vertical orientation or a horizontal orientation. Actuator system 70 adjusts first laser emitter 30 and/or second laser emitter 50 in coordination with each other such that line of light 34 and point of light 54 continuously intersect while being moved (e.g., rotated). Stated another way, laser level 10 includes actuator system 70, and actuator system 70 is configured to rotate the plane of light 32 with respect to base 14 about axis 22 that intersects the housing 20 (e.g., such as rotating plane of light 32 360 degrees), and actuator system 70 is configured to move where the point of light 54 intersects the line of light 34. Actuator system 70 is configured to rotate the line of light 34 and point of light 54 with respect to base 14 about axis 22 that intersects the housing 20 such that the point of light 54 continuously intersects the line of light 34 while the line of light 34 and the point of light 54 are being rotated. In various embodiments, actuator system 70 includes first actuator 72 and second actuator 74, and plane of light 32 is rotated by first actuator 72, and the beam of light 52 is rotated by second actuator 74 distinct from the first actuator 72. Stated another way, in various embodiments, first actuator 72 is configured to rotate the plane of light 32 and second actuator 74 is configured to move where the point of light 54 intersects the line of light 34.

In an alternate embodiment, the laser level includes a laser distance measuring device instead of the second laser emitter 50. In use, this alternate embodiment is configured to measure down a run at specific intervals, estimate material distances, measure ceiling heights, steel stud heights, etc.

Figure 6:
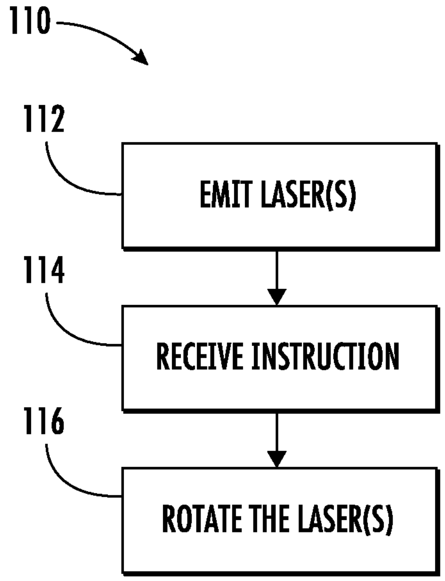
FIG. 6 is an exemplary method of using the laser level of FIG. 1, according to an exemplary embodiment.

Referring to FIG. 6, depicted is an exemplary method 110 of operating laser level 10. At step 112, one or more lasers are emitted from the laser level 10. For example, the method includes emitting a plane of light 32 from first laser emitter 30 to form a line of light 34 on surface 90, the first laser emitter 30 coupled to a base 14 of laser level 10 (e.g., via housing 20), and the method further includes emitting a beam of light 52 from second laser emitter 50 to form a point of light 54 on surface 90, the second laser emitter 50 coupled to base 14 (e.g., via housing 20), the point of light 54 intersecting the line of light 34.

At step 114, an instruction is received, such as by laser level 10. For example, laser level 10 wirelessly receives signal 18, such as an electronic signal, that includes the instruction from a remote control (e.g., remote control 16). The instruction may be to adjust one or more of the plane of light 32 and/or the beam of light 52, such as a first instruction to rotate the plane of light 32 and the beam of light 52.

At step 116, in response to receiving the instruction, one or more of the laser(s) are moved. For example, plane of light 32 and/or beam of light 52 are rotated about axis 22 with respect to housing 20 of laser level 10 such that the point of light 54 continuously intersects the line of light 34 while the plane of light 32 and the beam of light 52 are being rotated. Stated another way, in response to receiving the first instruction, the method includes rotating the plane of light 32 with respect to the base 14 about axis 22, and rotating the beam of light 52 with respect to the base 14 about axis 22 such that the point of light 54 continuously intersects the line of light 34 while the plane of light 32 and the beam of light 52 are being rotated. As another example, actuator system 70 rotates the plane of light 32 in response to laser level 10 wirelessly receiving a signal 18 from a remote control 16.

Figure 7:
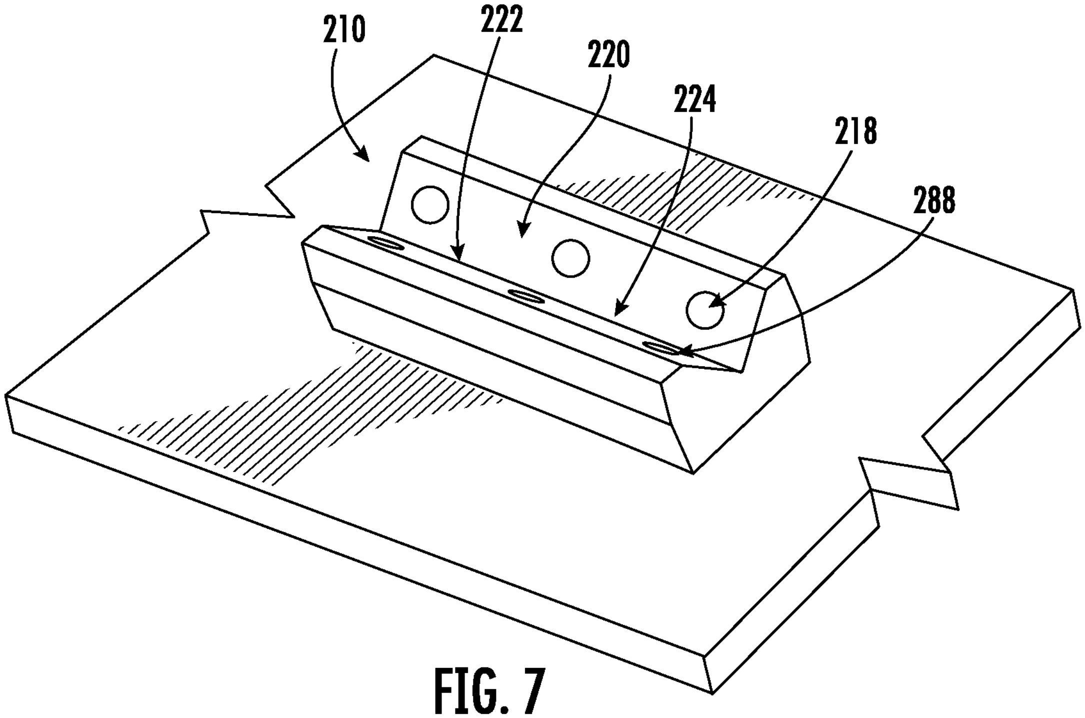
FIG. 7 is a perspective view of a laser level, according to an exemplary embodiment.
Figure 8:
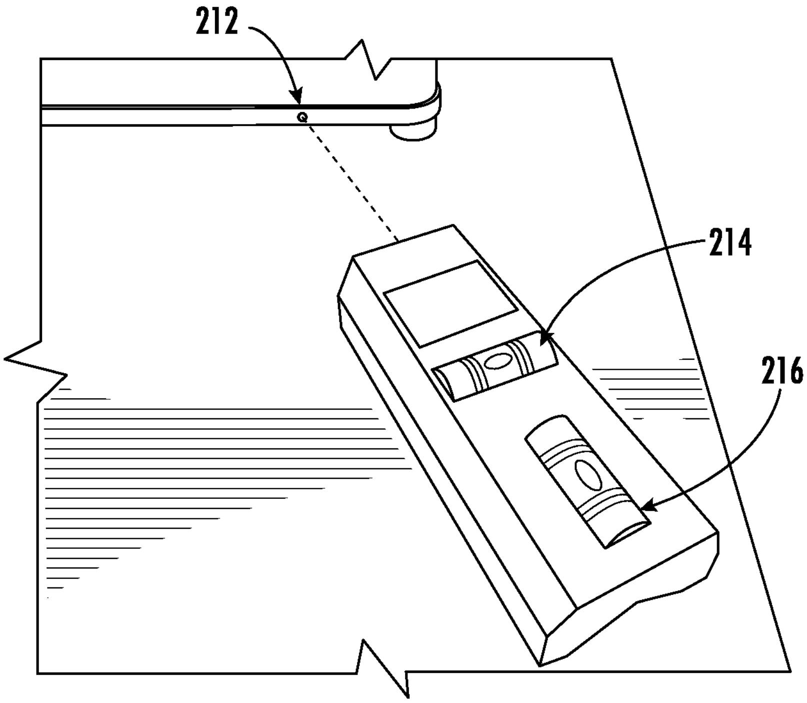
FIG. 8 is a perspective view of the laser level of FIG. 7, according to an exemplary embodiment.
Figure 9:
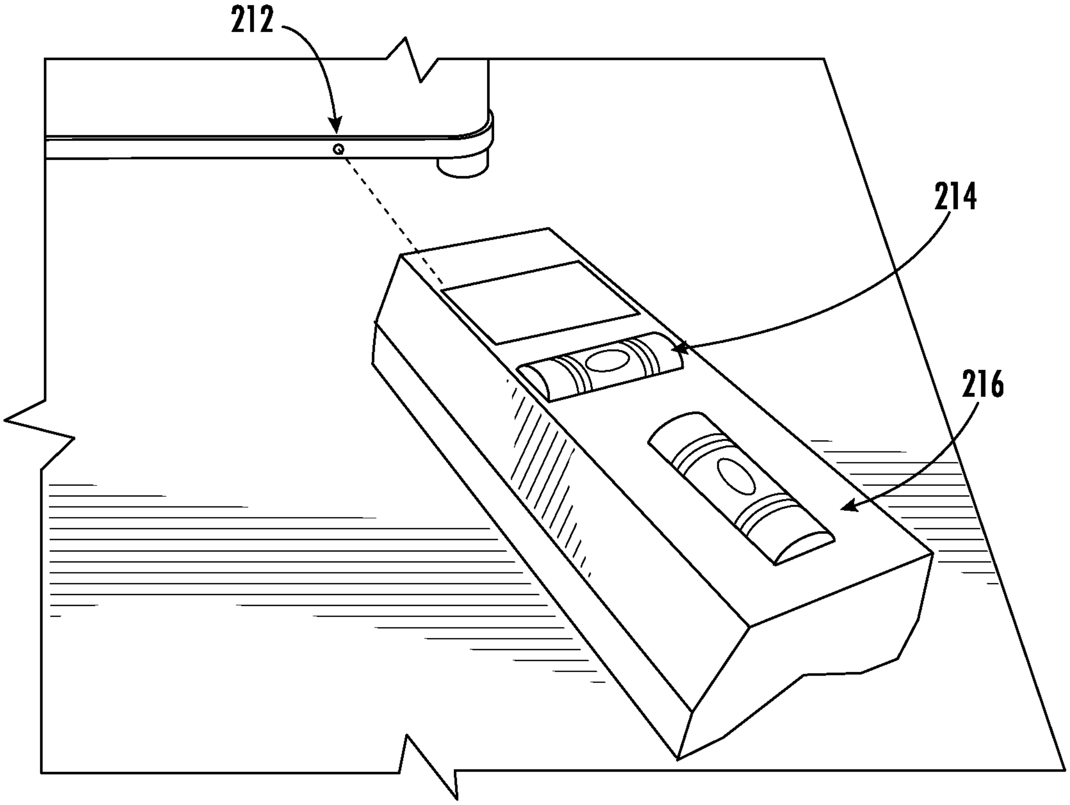
FIG. 9 is a perspective view of the laser level of FIG. 7, according to an exemplary embodiment.

Referring to FIGS. 7-9, various aspects of a laser level, shown as torpedo laser level 210, are shown. Torpedo laser level 210 includes a first orientation measuring device, shown as first vial 214, and a second orientation measuring device, shown as second vial 216. In various embodiments, first vial 214 and second vial 216 are planar with respect to each other and their respective longitudinal axes are perpendicular with respect to each other.

Torpedo laser level 210 includes a coupling recess, shown as v-groove 224. First surface 220 and second surface 222 extend away from v-groove 224. One or more coupling devices, shown as magnets 218, are arranged along one or both of first surface 220 and second surface 222.

In use, a ferrous object, such as a pipe, is placed within v-groove 224. The user can reference one or both of first vial 214 and second vial 216 to orient the pipe. Laser 212 is emitted from torpedo laser level 210, parallel to second vial 216, to facilitate the user marking a destination where the pipe will extend towards, such as pierce points in the wall where the pipe will extend through the wall.

Another object described herein is a clamp accessory. The clamp accessory includes a ceiling-mounting clamp and an optional laser-mounting clamp by which a laser can be attached and mounted into a ceiling at variable heights to aid users in setting a horizontal laser beam at a specific height.

The ceiling mounting clamp attaches to a surface, such as a ceiling (e.g., via magnets, screws, etc.) and clamps to a pole of any size and length. In various uses the pole is arranged vertically. A laser is coupled to the pole, such as via magnets on the laser or with a second clamp that attaches to the laser and clamps to the vertical pole.

Figure 10:
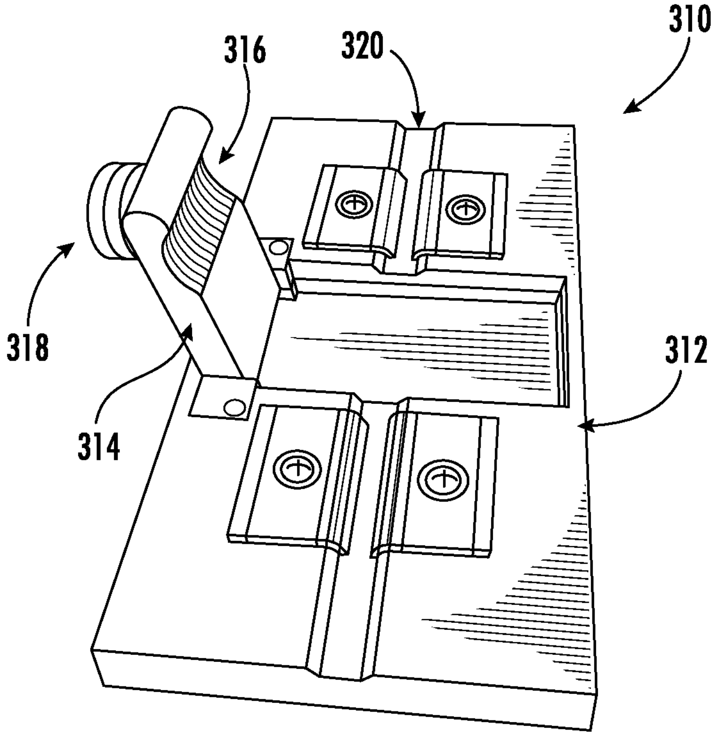
FIG. 10 is a perspective view of a rod holder, according to an exemplary embodiment.
Figure 11:
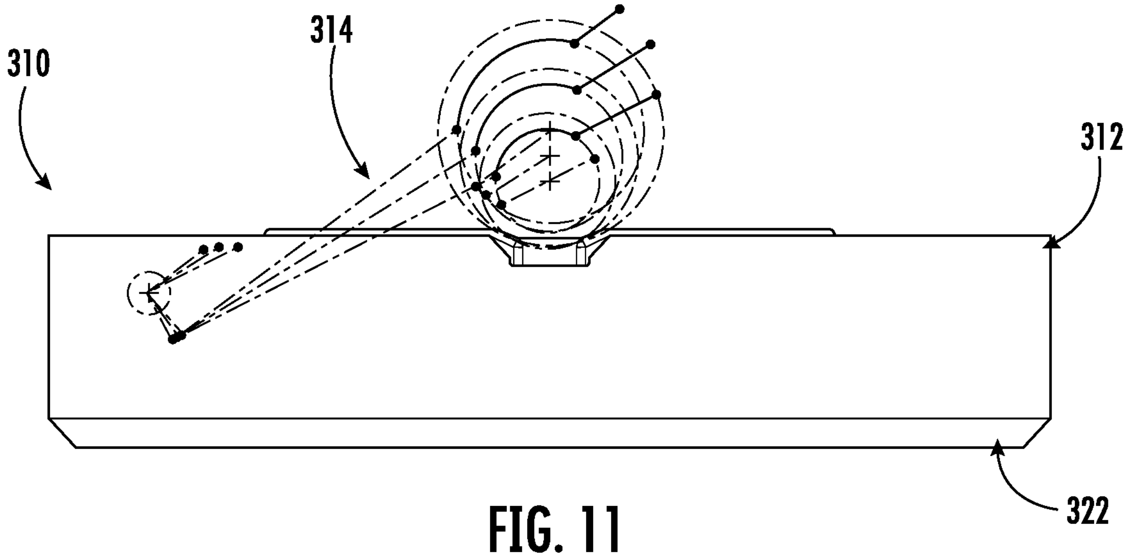
FIG. 11 is a schematic side view of the rod holder of FIG. 10, according to an exemplary embodiment.
Figure 12:
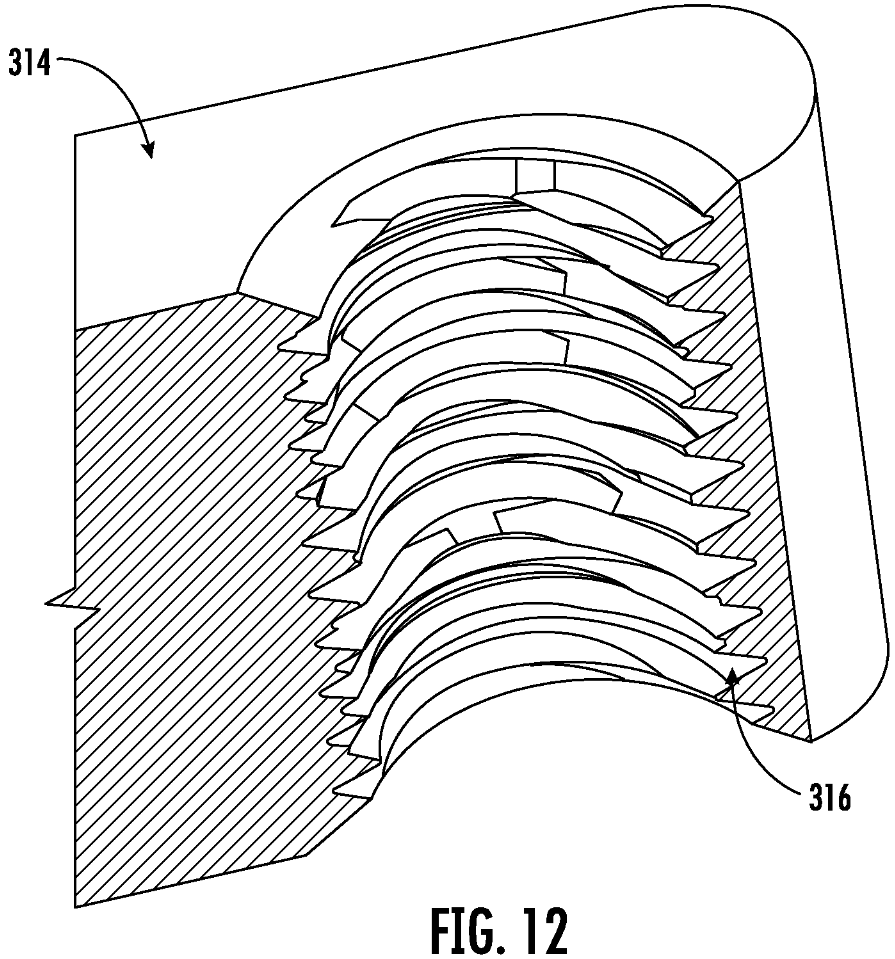
FIG. 12 is a perspective view of a portion of the rod holder of FIG. 10, according to an exemplary embodiment.

Referring to FIGS. 10-12, various aspects of a device for a coupling mechanism, shown as rod holder 310, are shown. Rod holder 310 includes a housing 312 and an arm 314 pivotally coupled to housing 312. Arm 314 includes a series of overlapping grooves, shown as threads 316. Threads 316 include multiple common thread profiles overlapping each other such that threaded rods of different sizes can mate with the arm 314 and provide friction to keep a laser level from sliding down the threaded rod captured by the arm 314. A magnet 318 is mounted on the back of the arm 314 and is oriented to attract the threaded rod into the profile and within groove 320.

A laser, such as a laser level, is coupled to back surface 322 of housing 312. Once the arm 314 is closed and magnetized against the threaded rod (assumed to be mounted in the ceiling), the laser can be set at a height to aid users in setting a horizontal line at various heights.

Figure 13:
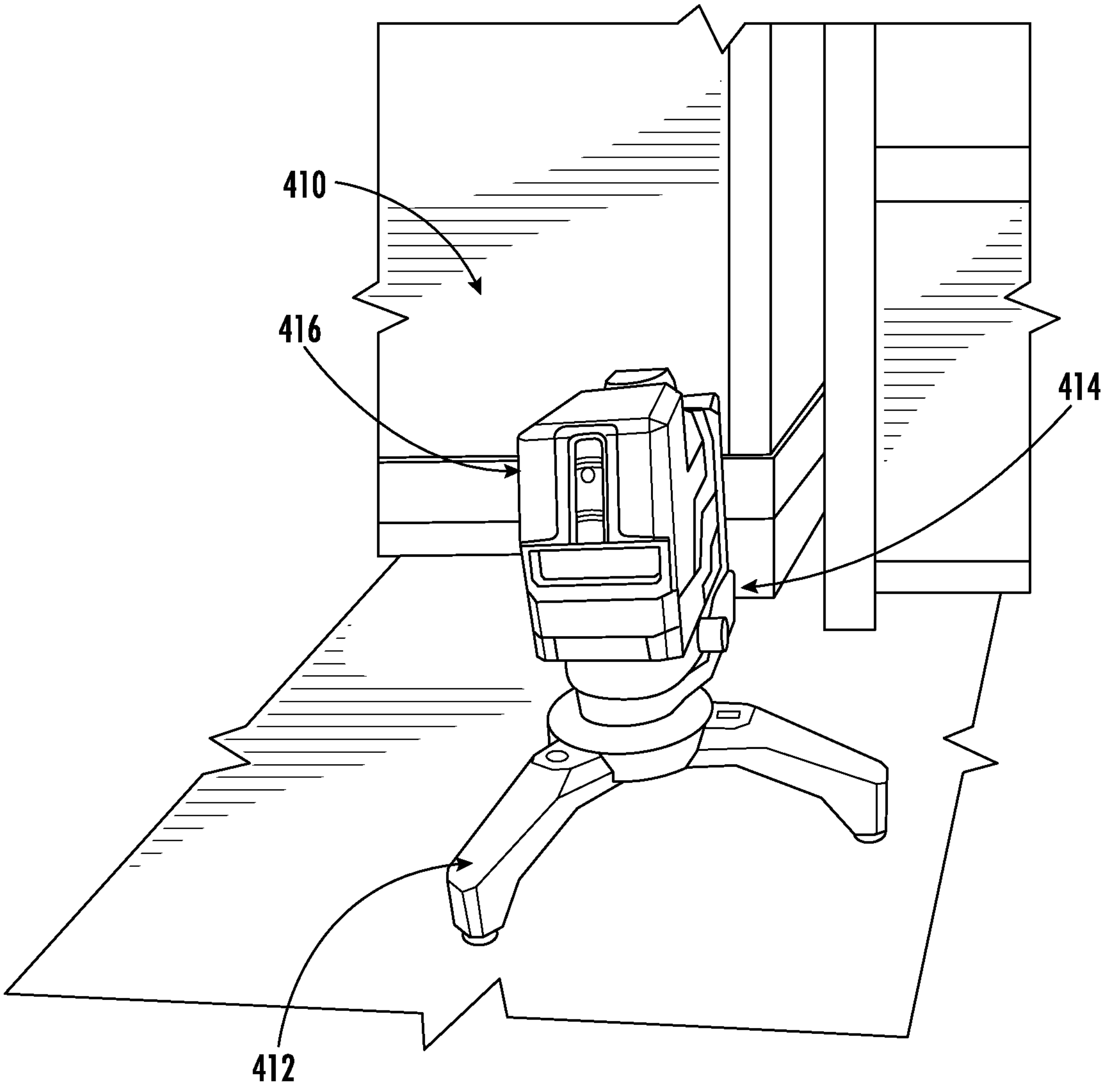
FIG. 13 is a perspective view of a laser stand and a laser level, according to an exemplary embodiment.
Figure 14:
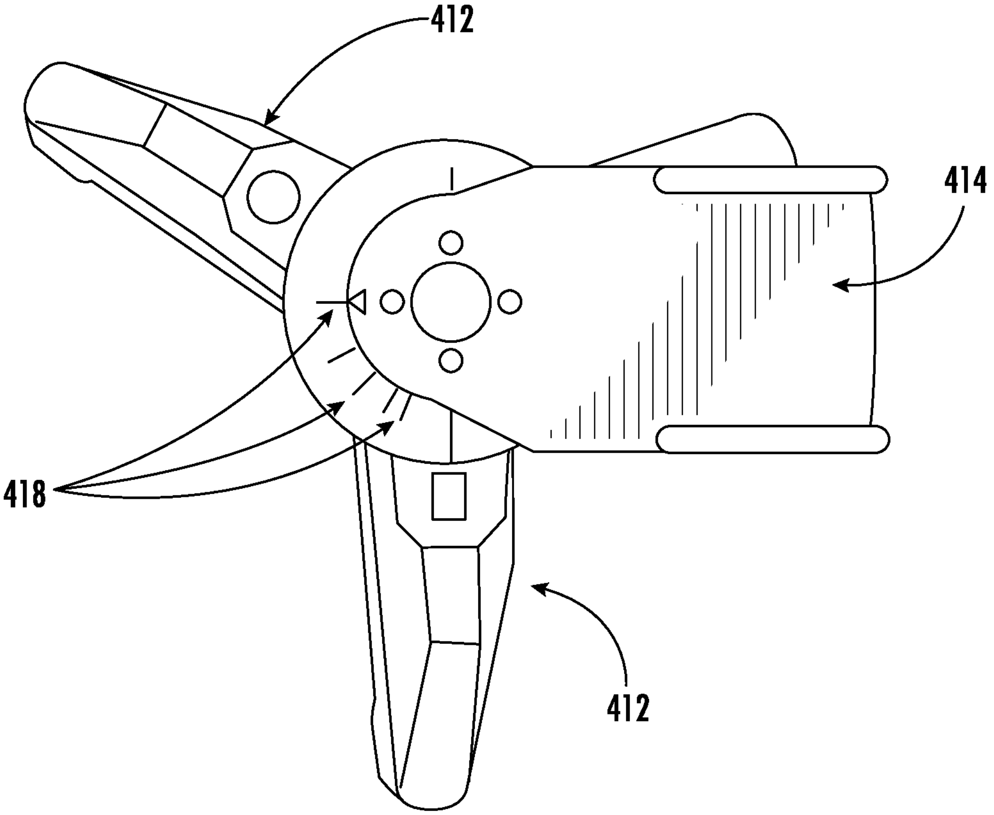
FIG. 14 is a perspective view of the laser stand of FIG. 13, according to an exemplary embodiment.

Referring to FIGS. 13-14, various aspects of a laser support, shown as laser stand 410, are shown. Laser stand 410 includes base 412 and support 414 rotatably coupled to base 412. A laser emitting device, shown as laser level 416, engages with support 414. A laser of the laser level 416 is aligned with a point, such as a line on a wall. Then, the laser level 416 is rotated to a predetermined angle by pivoting support 414 with respect to base 412. In various embodiments, one of base 412 or support 414 includes a protrusion and the other includes recesses, shown as detents 418, positioned at commonly used angular positions (e.g., 0 degrees, 22.5 degrees, 30 degrees, 45 degrees, 60 degrees, 90 degrees, and/or 180 degrees). Thus, rotation of support 414 with respect to base 412 gives the user tactile feedback when the support 414 has rotated to one of the predetermined angular positions, thereby expediting how quickly the user can rotate the laser level 416 to the selected angle.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A method of operating a laser beam generating device comprising:

emitting a plane of light from a first laser light generator to form a line of light on a surface, the first laser light generator coupled to a base of the laser beam generating device;

emitting a beam of light from a second laser light generator to form a point of light on the surface, the second laser light generator coupled to the base, the point of light intersecting the line of light;

receiving a first instruction to rotate the plane of light and the beam of light; and in response to receiving the first instruction:

rotating the plane of light with respect to the base about an axis; and rotating the beam of light with respect to the base about the axis such that the point of light continuously intersects the line of light while the plane of light and the beam of light are being rotated.

2. The method of claim 1, wherein the plane of light is rotated 360 degrees.

3. The method of claim 1, comprising adjusting where the point of light intersects the line of light.

4. The method of claim 1, comprising adjusting an orientation of the line of light to a vertical orientation or a horizontal orientation.

5. The method of claim 1, wherein the plane of light is rotated by a first actuator and the beam of light is rotated by a second actuator distinct from the first actuator.

6. The method of claim 5, wherein the plane of light comprises a first color and the beam of light comprises a second color distinct from the first color.

7. The method of claim 1, wherein the plane of light comprises a first color and the beam of light comprises a second color distinct from the first color.

8. The method of claim 1, wherein the first instruction is received wirelessly from a remote control.

9. A laser beam generating device comprising:

a base;

a housing coupled to the base;

a first laser light generator disposed within the housing operable to emit a plane of light to form a line of light on a surface;

a second laser light generator disposed within the housing operable to emit a beam of light to form a point of light on the surface, the beam of light intersecting the plane of light; and an actuator system configured to rotate the plane of light with respect to the base about an axis that intersects the housing, and configured to move where the point of light intersects the line of light.

10. The laser beam generating device of claim 9, the actuator system comprising a first actuator configured to rotate the plane of light and a second actuator configured to move where the point of light intersects the line of light.

11. The laser beam generating device of claim 10, wherein the plane of light comprises a first color and the beam of light comprises a second color distinct from the first color.

12. The laser beam generating device of claim 9, wherein the plane of light comprises a first color and the beam of light comprises a second color distinct from the first color.

13. The laser beam generating device of claim 9, wherein the actuator system is configured to orient the line of light to one of a horizontal orientation or a vertical orientation.

14. The laser beam generating device of claim 9, wherein the actuator system is configured to rotate the plane of light 360 degrees.

15. The laser beam generating device of claim 9, wherein the actuator system rotates the plane of light in response to the laser beam generating device wirelessly receiving a signal from a remote control.

16. A laser beam generating device comprising:

a base;

a housing coupled to the base;

a first laser light generator coupled to the housing and operable to generate a line of light on a surface;

a second laser light generator coupled to the housing and operable to generate a point of light on the surface, wherein the point of light intersects the line of light; and an actuator system configured to rotate the line of light and the point of light with respect to the base about an axis that intersects the housing, wherein the point of light continuously intersects the line of light while the line of light and the point of light are being rotated.

17. The laser beam generating device of claim 16, wherein the actuator system rotates the line of light in response to the laser beam generating device wirelessly receiving a signal from a remote control.

18. The laser beam generating device of claim 16, wherein the actuator system is configured to rotate the plane of light 360 degrees.

19. The laser beam generating device of claim 16, wherein the line of light comprises a first color and the point of light comprises a second color distinct from the first color.

20. The laser beam generating device of claim 16, the actuator system comprising a first actuator configured to rotate the line of light and a second actuator configured to move where the point of light intersects the line of light.

* * * * *